United States Patent
Blaner et al.

(10) Patent No.: US 11,221,957 B2
(45) Date of Patent: Jan. 11, 2022

(54) PROMOTION OF ERAT CACHE ENTRIES

(71) Applicant: International Business Machines Corporation, Armonk, NY (US)

(72) Inventors: Bartholomew Blaner, Shelburne, VT (US); Jay G. Heaslip, Williston, VT (US); Benjamin Herrenschmidt, Lyneham (AU); Robert D. Herzl, Windham, NH (US); Jody Joyner, Austin, TX (US); Jon K. Kriegel, Rochester, MN (US); Charles D. Wait, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 16/119,013

(22) Filed: Aug. 31, 2018

(65) Prior Publication Data

US 2020/0073817 A1   Mar. 5, 2020

(51) Int. Cl.
*G06F 12/0897* (2016.01)
*G06F 12/02* (2006.01)
*G06F 12/1009* (2016.01)

(52) U.S. Cl.
CPC ........ *G06F 12/0897* (2013.01); *G06F 12/023* (2013.01); *G06F 12/1009* (2013.01); *G06F 2212/507* (2013.01); *G06F 2212/657* (2013.01)

(58) Field of Classification Search
None
See application file for complete search history.

(56) References Cited

U.S. PATENT DOCUMENTS

| | | | | |
|---|---|---|---|---|
| 6,519,684 B1 * | 2/2003 | Moyer | ............... | G06F 12/1027 |
| | | | | 711/134 |
| 6,629,207 B1 * | 9/2003 | Yoshioka | ............ | G06F 12/0864 |
| | | | | 711/125 |
| 7,376,807 B2 | 5/2008 | Moyer | | |
| 8,898,430 B2 | 11/2014 | Chakrala et al. | | |
| 8,954,755 B2 | 2/2015 | Muff et al. | | |
| 9,176,888 B2 | 11/2015 | Martin | | |
| 10,394,711 B2 * | 8/2019 | Adar | ................... | G06F 12/0815 |

(Continued)

FOREIGN PATENT DOCUMENTS

CN   105993003 A   10/2016

OTHER PUBLICATIONS

Nair, R. et al., "Active Memory Cube: A processing-in-memory architecture for exascale systems", IBM Journal of Research and Development, vol. 59, No. 2/3, Paper 17, Mar./May 2015.

*Primary Examiner* — Stephanie Wu
(74) *Attorney, Agent, or Firm* — Scully, Scott, Murphy & Presser, P.C.

(57) ABSTRACT

A method, computer program product, and a computer system are disclosed for processing information in a processor that in one or more embodiments includes receiving a request for an Effective Address to Real Address Translation (ERAT); determining whether there is a permissions miss; changing, in response to determining there is a permission miss, permissions of an ERAT cache entry; and providing a Real Address translation. The method, computer program product, and computer system may optionally include providing a promote checkout request to a memory management unit (MMU).

18 Claims, 3 Drawing Sheets

(56) References Cited

U.S. PATENT DOCUMENTS

| | | | |
|---|---|---|---|
| 2013/0191651 A1* | 7/2013 | Muff | G06F 12/1027 |
| | | | 713/193 |
| 2015/0082304 A1* | 3/2015 | Hepkin | G06F 21/53 |
| | | | 718/1 |
| 2015/0347044 A1* | 12/2015 | Gschwind | G06F 3/0619 |
| | | | 711/3 |
| 2016/0314078 A1 | 10/2016 | Blake et al. | |
| 2016/0350225 A1 | 12/2016 | Podaima et al. | |
| 2017/0109165 A1* | 4/2017 | Batley | G06F 9/30043 |
| 2017/0115924 A1* | 4/2017 | Abali | G06F 13/362 |
| 2017/0286421 A1* | 10/2017 | Hayenga | G06F 12/1009 |
| 2017/0329718 A1* | 11/2017 | Rose | G06F 12/1027 |
| 2018/0095892 A1* | 4/2018 | Wilkinson | G06F 9/3004 |
| 2018/0300256 A1* | 10/2018 | Blaner | G06F 12/1027 |
| 2019/0073473 A1* | 3/2019 | VanderLeest | G06F 21/554 |
| 2019/0171376 A1* | 6/2019 | Stephens | G06F 12/1027 |
| 2019/0205263 A1* | 7/2019 | Fleming | G06F 12/0246 |
| 2019/0272239 A1* | 9/2019 | Hagersten | G06F 12/0811 |

* cited by examiner

PROMOTION OF ERAT CACHE ENTRIES

BACKGROUND

The disclosure herein relates generally to data processing, and more particularly, to methods, apparatus, and products for promoting Effective to Real Address Translation (ERAT) cache entries in a computer system.

Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer system technology that has advanced is computer processors. As the number of computer systems in data centers and the number of mobile computing devices increases, the need for more efficient computer processors also increases. Speed of operation and power consumption are at least two areas of computer processor technology that affect efficiency of computer processors.

A processor may use conventional effective address (i.e., virtual address) to real address (i.e., physical address) translation techniques to improve computer processor efficiency. For instance, when the processor receives an effective address, the address is typically translated via a tablewalk process that translates the address using table lookups. The tables are present in memory and are typically defined by an operating system or a hypervisor. To avoid performing the tablewalk process for each received effective address, small caches of recently translated addresses are kept locally with the units or cores of the processor. For example, a translation lookaside buffer ("TLB") may be located on a memory management unit ("MMU") or an ERAT cache may be located on an accelerator unit ("AU") on a processor.

In situations in which a translated address is not located in the ERAT cache, the ERAT cache requests an effective address to real address translation from the MMU by sending a checkout request to the MMU. As there are typically more than one AU, there are also typically more than one checkout request waiting to be processed by the MMU. Having received the translation, the MMU provides the translation in a checkout response to the ERAT cache, and the ERAT cache creates an entry in the ERAT cache that includes the translation. Typically, latency can occur when the system and/or processor has to perform translations, including the latency incurred from performing checkin and checkout transactions by the ERAT cache and MMU.

SUMMARY

The summary of the disclosure is given to aid understanding of a computer system, computer architectural structure, processor, and method of promoting ERAT cache entries in a computer system, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, and their method of operation to achieve different effects.

According to an embodiment of the present disclosure, a method of processing information in a processor of a computer system includes receiving a request for an ERAT. The method in an aspect includes determining whether there is a permissions miss. The method in an embodiment includes changing, in response to determining there is a permissions miss, permissions of an ERAT cache entry. The method preferably includes providing a Real Address translation.

According to one or more embodiments, a computer program product includes a non-transitory computer-readable storage medium having program instructions embodied therewith, the program instructions executable by one or more processors. The program instructions in an embodiment includes receiving a request for an ERAT. The program instructions in an embodiment includes determining whether there is a permissions miss. The program instructions in an aspect includes changing, in response to determining there is a permissions miss, permissions of an ERAT cache entry, and in an embodiment, providing a Real Address translation.

According to one or more embodiments, a computer system includes one or more processors, each of the one or more processors including a MMU, at least one AU, and at least one ERAT cache, the ERAT cache associated with, preferably part of a respective AU; one or more non-transitory computer-readable storage media; and program instructions, stored on the one or more non-transitory computer-readable storage media, executable by at least one of the one or more processors. The program instructions in an embodiment includes receiving a request for an ERAT, and in an aspect, determining whether there is a permissions miss. The program instructions in an embodiment includes changing, in response to determining there is a permissions miss, permissions of an ERAT cache entry, and, in an aspect, providing a Real Address translation. The request for the ERAT in an embodiment includes a request to establish write permission for the ERAT cache entry.

The embodiments of the present disclosure reduce the latency incurred by effective address ("EA") to real address ("RA") translations, thus increasing processor performance and efficiency. Moreover, the embodiments reduce the latency incurred by promoting an ERAT cache entry having read access permissions to an entry having at least write permissions in a computer system having a distributed MMU. Reducing latency in such transactions increases the performance and speed at which one or more processors operate.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The various aspects, features and embodiments of a computer system, computer architectural structure, processor, and their method of operation will be better understood when read in conjunction with the figures provided. Embodiments are provided in the figures for the purpose of illustrating aspects, features, and/or various embodiments of the computer system, computer architectural structure, processors, and their method of operation, but the claims should not be limited to the precise arrangement, structures, features, aspects, assemblies, systems, embodiments, or devices shown, and the arrangements, structures, subassemblies, features, aspects, methods, processes, embodiments, and devices shown may be used singularly or in combination with other arrangements, structures, assemblies, subassemblies, systems, features, aspects, embodiments, methods and devices.

DETAILED DESCRIPTION

The following description is made for illustrating the general principles of the invention and is not meant to limit the inventive concepts claimed herein. In the following detailed description, numerous details are set forth in order to provide an understanding of the computer system, computer architectural structure, processor, and their method of operation, however, it will be understood by those skilled in the art that different and numerous embodiments of the computer system, computer architectural structure, processor, and their method of operation may be practiced without those specific details, and the claims and disclosure should not be limited to the embodiments, subassemblies, features, processes, methods, aspects, features or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following discussion omits or only briefly describes conventional features of information processing systems, including processors and microprocessor systems and architectures, which are apparent to those skilled in the art. It is assumed that those skilled in the art are familiar with the general architecture of processors, and in particular with processors which operate in an out-of-order execution fashion. It may be noted that a numbered element is numbered according to the figure in which the element is introduced, and is typically referred to by that number throughout succeeding figures.

Exemplary methods, apparatus, and products for performing EA to RA translations, and in particular, for promoting the permissions of ERAT cache entries in a computer system having a distributed MMU in accordance with the present disclosure are described further below with reference to the Figures.

Figure 1:
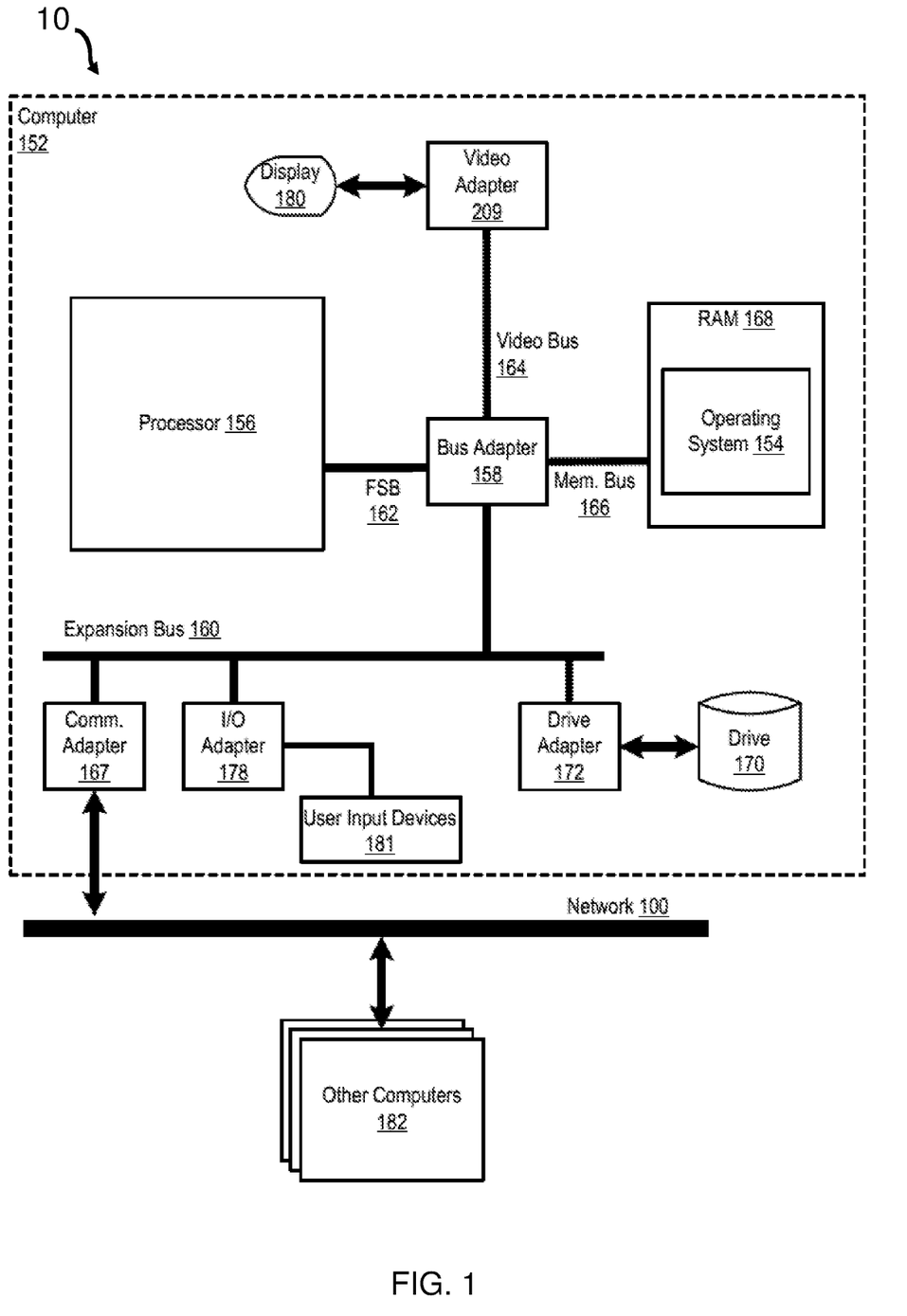
FIG. 1 is a functional block diagram illustrating a computer system, according to embodiments of the present disclosure.

FIG. 1 is a functional block diagram illustrating a computer system 10. The system 10 includes an example of automated computing machinery in the form of a computer 152.

The computer 152 may include at least one processor 156 or central processing unit ("CPU") as well as random access memory 168 ("RAM"), which is connected via a high speed memory bus 166 and bus adapter 158 to the processor 156 and to other components of the computer 152. In some embodiments, RAM 168 may be an embedded dynamic random access memory (eDRAM). In some embodiments, RAM 168 may be utilized by accelerator units and other units, such as processing cores, on the processor 156, via communication fabric 204. The RAM 168 may receive information and messages from a memory management unit ("MMU"), such as MMU 206, including table walk data requests and page table entry updates.

The processor 156 may be implemented as a multi-slice processor. The term "multi-slice" may refer to a processor having a plurality of similar or identical sets of components, in which each set of components may operate independently of all the other sets or in concert with the one or more of the other sets.

Although the processor 156 is shown to be coupled to RAM 168 through the front side bus 162, the bus adapter 158, and the high speed memory bus 166, those of ordinary skill in the art will recognize that such configuration is only an example implementation and other configurations of coupling the processor 156 to other components of the system 10 may be utilized. For example, in some embodiments the processor 156 may include a memory controller configured for direct coupling to the memory bus 166. Yet, in other embodiments, the processor 156 may support direct peripheral connections, such as Peripheral Component Interconnect express ("PCIe") connections and the like.

An operating system 154 may be stored in RAM 168 of the computer 152. Operating systems, useful in computers configured for operation of a processor, may include UNIX™, Linux™, Microsoft Windows™, AIX™, IBM's z/OS™, and others known to those of ordinary skill in the art. In addition to the operating system 154 and the data processing application 102 being located in RAM 168, other components of such software may be stored in non-volatile memory, such as on a disk drive 170.

The computer 152 may include a disk drive adapter 172 coupled through an expansion bus 160 and bus adapter 158 to the processor 156 and other components of the computer 152. The disk drive adapter 172 may connect non-volatile data storage to the computer 152 in the form of the disk drive 170. The disk drive adapter may include Integrated Drive Electronics ('IDE') adapters, Small Computer System Interface ('SCSI') adapters, and others known to those of ordinary skill in the art. Non-volatile computer memory may also be implemented as an optical disk drive, electrically erasable programmable read-only memory (so-called 'EEPROM' or 'Flash' memory), RAM drives, and others known to those of ordinary skill in the art.

The computer 152 may include one or more input/output ("I/O") adapters 178. I/O adapters 178 may implement user-oriented input/output through, for example, software drivers and computer hardware for controlling output to display devices, such as computer display screens, as well as user input from user input devices 181, such as a keyboard and mouse. The computer 152 may include a video adapter 209, which is an example of an I/O adapter specially designed for graphic output to a display device 180, such as a display screen or computer monitor. Video adapter 209 is connected to the processor 156 through the high speed video bus 164, bus adapter 158, and the front side bus 162, which may also be a high speed bus. I/O adapters 178 may also include COMM and Drive adapters. I/O adapters 178 may also be a PCI Express in which all I/Os are connected.

The computer 152 may include a communications adapter 167 for data communications with other computers 182 and for data communications with a data communications network 100. Such data communications may be carried out serially through RS-232 connections, through external buses such as a Universal Serial Bus ("USB"), through data communications networks such as IP data communications networks, and in other ways known to those of ordinary skill in the art. Communications adapter 167 may implement the hardware level of data communications through which one computer sends data communications to another computer, directly or through the data communications network 100. Examples of the communications adapter 167 may include modems for wired dial-up communications, Ethernet (IEEE 802.3) adapters for wired data communications, and 802.11 adapters for wireless data communications.

The arrangement of computers and other devices illustrated in FIG. 1 are for explanation, not for limitation. Data processing systems useful according to various embodiments of the present disclosure may include additional servers, routers, other devices, and peer-to-peer architectures. Networks in such data processing systems may support many data communications protocols, including, for example, TCP (Transmission Control Protocol), IP (Internet Protocol), HTTP (HyperText Transfer Protocol), WAP (Wireless Access Protocol), HDTP (Handheld Device Transport Protocol), and others known to those of ordinary skill in the art. Various embodiments of the present disclosure may be implemented on a variety of hardware platforms, in addition to those illustrated in FIG. 1.

Figure 2:
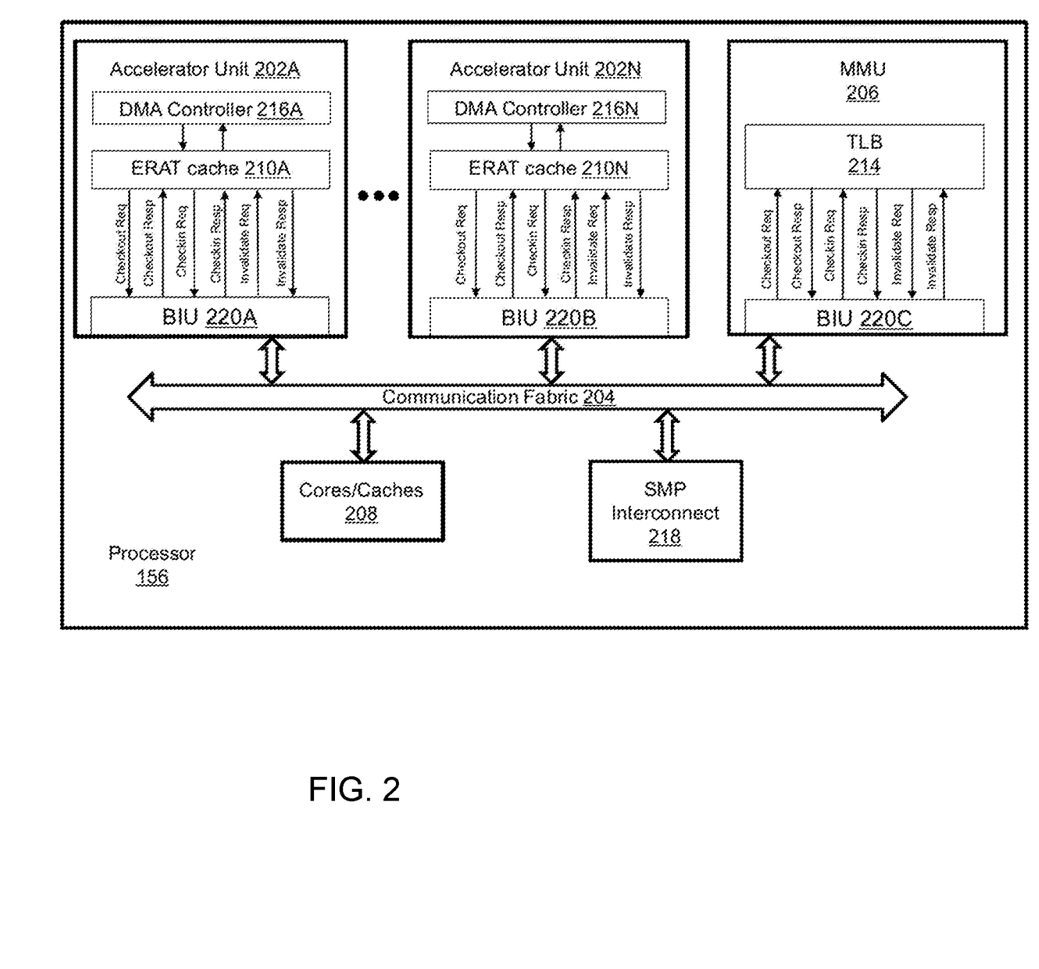
FIG. 2 is a functional block diagram illustrating a processor configured to perform EA to RA translations, according to embodiments of the present disclosure.

FIG. 2 is a functional block diagram illustrating processor 156 configured to perform EA to RA translations, and in particular, to practice embodiments of the disclosure that decrease latency in processors, including decreasing latency in performing operations that involve EA to RA translations. Processor 156 may include multiple units, such as, one or more AUs, e.g., AU 202A and AU 202N, a distributed MMU 206, a symmetric multiprocessing ("SMP") interconnect 218, and core/caches 208, each being coupled to communications fabric 204, which is configured to transmit messages between the units, connectors, and storage on processor 156. AU 202A and AU 202N include direct memory access ("DMA") Controller 216A and ERAT cache 210A and DMA Controller 216N and ERAT cache 210N, respectively. The MMU 206 may be a distributed MMU connected to one or more AUs. The MMU 206 may include a segment lookaside buffer ("SLB"), a translation lookaside buffer ("TLB") (214), and/or an in use scoreboard ("IUSB"). The SMP interconnect 218 allows additional processors to be connected to processor 156, thus increasing computational power. The SMP 218 interconnect may connect processor 156 to other processors via a different network connection, which includes a higher bandwidth, lower latency and in which cache coherence traffic and data traffic flow over the different network connection.

The DMA controller 216A and DMA Controller 216N may each make requests to an ERAT cache on behalf of the respective AU. That is, the DMA controller 216A may perform memory moves on behalf of AU 202A, and DMA Controller 216N may perform memory moves on behalf of AU 202N. DMA controller 216A and DMA Controller 216N may each have a source address for input data and a target address for output data from the respective AUs and ERAT caches.

In some embodiments, AU 202A, AU 202N, MMU 206, core/caches 208, and communications fabric 204 may be implemented on the same semiconducting die or on multiple interconnected dies. In some embodiments, processor 156 may include multiple accelerator units, such as AU 202A and AU 202N, in which each accelerator unit interacts with MMU 206. In other embodiments, processor 156 may include only one accelerator unit. For purpose of clarity, the paragraphs below discuss the embodiments of the disclosure in view of AU 202A and ERAT cache 210A. However, this discussion is not intended to be limiting or restrictive to only the features of AU 202A, DMA Controller 216A, and ERAT cache 210A; but rather, all or some features of AU 202A may be equally applicable in other accelerator units, such as AU 202N, all or some features of DMA Controller 216A may be equally applicable in other DMA controllers, such as DMA Controller 216N, and in embodiments, all or some features of ERAT cache 210A may be equally applicable in other ERAT caches, such as ERAT cache 210N.

AU 202A is configured to provide an interface between external processing elements and the elements within processor 156, including providing access to locations in RAM 168 on the computer 152, the core/caches 208 on processor 156, or other memory locations in or connected to computer 152. In some embodiments, AU 202A may include coherent accelerator processor interfaces, graphic acceleration interfaces, cryptographic interfaces, and streaming interfaces. The AU 202A of processor 156 may be specialized hardware that can perform specific compute functions, such as encryption, decryption, compression, or decompression.

AU 202A includes an ERAT cache 210A to store recently received effective address ("EA") to real address ("RA") translations from the MMU. The EA is a virtual address used by elements and processes in the computing system 10 to refer to memory locations. The RA is a physical address. During operation of the processor, the EA must be translated into the RA in order for the accelerator unit 202A to access requested data. ERAT cache 210A stores each recent EA to RA translation in an ERAT cache entry. Each entry in the ERAT cache is associated with an ERAT index, which identifies the ERAT cache entry within the ERAT cache 210A. For example, an ERAT index of 4 may refer to the fourth (or fifth) entry in the ERAT cache 210A. A variety of indexing schemes, known to those of ordinary skill in the art, may be used for ERAT indexes. The ERAT cache 210A in an embodiment may have thirty-two entries/locations to store EA to RA translations. In an embodiment, one or more of the entries in the ERAT cache 210A may be empty or free, e.g., available to receive information.

ERAT cache entries may have various read/write permissions. A type of permission, e.g. read only permission, write only permission, or read/write permission, for a given ERAT cache entry may be marked or noted in a table, which may be setup by the operating system 154. More specifically, a bit, such as a C bit, in an ERAT cache entry of the ERAT cache 210A may indicate whether an ERAT cache entry has read permission, write permission, or read/write permission. For example, an ERAT cache entry may have a C bit to identify or designate its read/write permission. For instance, in an embodiment, the C bit for the ERAT cache entry is set to 0 if the ERAT cache entry has read only permission, and the C bit is set to 1 if the ERAT cache entry has read/write permission. In another example, the C bit may be set to 1 if the ERAT cache entry has write permission and a write to an address in the ERAT cache entry is or has been performed. Alternatively, the C bit of the entries or identifiers can be switched for the various read/write permissions.

The MMU 206 is a unit on processor 156 that translates EAs into RAs. The MMU 206 may perform a table walk or other procedures, such as a TLB lookup, to obtain a translation for a given EA, and may store previous translations in lookaside buffers, such as TLB 214. The TLB 214 may be a cache of virtual addresses mapped to real addresses stored in page table entries, i.e., TLB entries, in TLB 214. Each page table entry ("PTE") entry may be associated with a TLB index, which identifies the TLB or PTE entry within the TLB. For example, a TLB index of 4 may refer to the forth (or fifth) entry in the TLB. A variety of indexing schemes, known to those of ordinary skill in the art, may be used for TLB indexes. Some translations may utilize the TLB 214 without utilizing an SLB. For example, a radix translation may use two entries in the TLB 214 (e.g., a guest and host) instead of utilizing the SLB. Moreover, a bit in a PTE, corresponding to an ERAT cache entry, of the MMU 206 may indicate whether the PTE has read permission, write permission, or read/write permission. In various embodiments, the bit in the PTE may be a C bit and have the same or similar features to the C bit related to the ERAT cache entries.

The SLB (not shown) may be a cache of effective segment identifiers (ESID) mapped to virtual segment identifiers (VSID) stored in SLB entries. In hash page table translations, a portion of the EA, referred to as the ESID, is used to obtain a VSID, and a combination of the EA and VSID are used to determine a virtual address. Each SLB entry is associated with an SLB index, which identifies the SLB entry within the SLB. For example, a SLB index of 4 may refer to the forth (or fifth) entry in the SLB. A variety of indexing schemes, known to those of ordinary skill in the art, may be used for SLB indexes.

The IUSB (not shown) may be a data structure that stores ERAT indexes mapped to TLB indexes and, if applicable, SLB indexes. The IUSB may map TLB indexes and SLB indexes to ERAT indexes that identify entries in the ERAT cache 210A. The IUSB tracks which entries in the SLB and the TLB store translations that have been utilized to generate translations currently stored in ERAT caches. Specifically, the IUSB indicates, for a given ERAT index, which TLB and SLB entries (identified by TLB indexes and SLB indexes) were used to generate the translation stored in the ERAT cache entry identified by the ERAT index. An error may occur if the ERAT cache 210A issues a promote checkout request for an entry and the MMU 206 discovers this entry is not InUse in the ERAT cache 210A.

The communication fabric 204 may be any type of communication fabric known to one of ordinary skill in the art that allows communication between the various units, memory, and interconnects in processor 156. The communication fabric 204 may also be an out-of-order on-chip bus, in which the transactions (e.g., checkin request/response and checkout request/response) are transmitted as packets on the out-of-order on-chip bus. Further, the transactions (e.g., checkin request/response and checkout request/response) may arrive at either or both the MMU and AUs in an arbitrary order. The MMU and AUs are coupled to the communication fabric 204 via their respective Bus Interface Units ("BIU"), such as BIU 220A, 220B, and 220C.

In some embodiments, the core/caches 208 may include the processor cores and their level one ("L1"), level two ("L2"), and/or last level cache ("LLC") on processor 156. The L1, L2, and LLC may be arranged in an arbitrary configuration, such a split Instruction & Data L1, shared L2, private L2, etc.

During operations, the system may need to make translations between effective (i.e., virtual) addresses and real addresses. As indicated above, the MMU 206 may provide EA to RA translations and send the translations to the ERAT cache 210A, in which the translations are stored for use in ERAT cache entries. For example, in an operation, the DMA controller 216A, on behalf of the AU 202A, may receive one or more requests (e.g. a read request to compress a page or a write request to write compression results of a page), in which the request may require an EA to RA translation to perform the request. When the AU 202A needs a translation of an EA to perform the request, the DMA controller 216A, on behalf of the AU 202A, passes the request to the ERAT cache 210A to determine whether the ERAT cache 210A has the translation in an entry of the ERAT cache 210A. The ERAT cache 210A, in an embodiment, performs a lookup, e.g., the ERAT cache 210A is searched, to see if the translation is already located in an entry in the ERAT cache 210A. If the translation is located in an entry of the ERAT cache 210A, the ERAT cache 210A provides the translation to the AU 202A. If the ERAT cache 210A does not have the requested translation, the ERAT cache 210A requests an EA to RA translation (i.e., an ERAT) from the MMU 206 by sending a checkout request to the MMU 206, via BIU 220A, communication fabric 204, and BIU 220C. The MMU 206 receives the checkout request requesting the EA to RA translation, and generates the translation by performing a TLB lookup by searching the TLB 214 for the PTE of the EA or performing a tablewalk. The MMU 206 may also mark the PTE, which includes the translation, in TLB 214 as being InUse. The MMU 206 sends the translation via the MMU checkout response, BIU 220c, communication fabric 204, and BIU 220A, to the ERAT cache 210A. The ERAT cache 210A receives the checkout response, which may contain the checkout request status and the translation, from the MMU 206. Having received the checkout response that includes the translation, the ERAT cache 210A creates an entry in the ERAT cache 210A that includes the translation and provides the translation to the AU 202A. In an example, if the request received by the AU 202A is a read request, the entry created in the ERAT cache 210A is established as having read permissions. In another example, if the request received by the AU 202A is a write request, the entry created in the ERAT cache 210A is established as having write permissions or read/write permissions.

In various embodiments, the MMU 206 may be inclusive of the ERAT caches in the accelerator units, in that each translation cached in the ERAT caches may also be stored within the lookaside buffers on the MMU 206 such that each ERAT cache entry in the ERAT cache has a corresponding PTE stored in the TLB 214. This TLB entry may be marked as InUse when there is a corresponding ERAT cache entry. As the MMU 206 is inclusive of the ERAT cache 210A, the ERAT cache 210A cannot silently evict an entry in the ERAT cache 210A when there is a request for a new translation without informing the MMU 206, as the MMU 206 and ERAT cache 210A will be out of sync. Thus, in conventional systems, a checkin request and checkin response transaction for the entry in the ERAT cache 210A may be necessary between the ERAT cache 210A and MMU 206. That is, for the ERAT cache 210A to evict an entry, the ERAT cache 210A may issue a checkin request of the ERAT cache entry to the MMU 206. The MMU 206 checks in the entry and issues a checkin response to the AU 202A to acknowledge that the entry is no longer in use in the ERAT cache 210A. In some embodiments, the MMU 206 maintains the status of the ERAT cache entries, e.g., whether or not the entries are InUse, in the MMU 206 scoreboard.

When the MMU 206 wants to remove an entry from either the ERAT cache or the TLB 214, the MMU, in an embodiment, invalidates an InUse entry. To invalidate an InUse entry, the MMU 206 sends an invalidate request to the ERAT cache 210A of the AU 202A. When the invalidation of the entry is complete, the ERAT cache 210A sends an invalidate response to the MMU 206. In some embodiments, when the ERAT cache 210A removes or evicts an ERAT cache entry from ERAT cache 210A via a checkin request, i.e., checked into the MMU 206, the MMU 206 removes the corresponding entry, such as the PTE, from the TLB 214 and, if applicable, SLB. When the entry is removed from the TLB 214 or, if applicable, the SLB, the MMU 206 sends a checkin response to the ERAT cache 210A that indicates that the corresponding ERAT cache entry is no longer 'InUse'.

In an example, the DMA controller 216A, on behalf of the AU 202A, may receive a request (e.g., a write request to write compression results of a page) that requires an EA to RA translation to perform the request. The DMA controller 216A passes the request to the ERAT cache 210A, and the ERAT cache 210A, in an embodiment, searches its entries to determine whether the translation is in an entry of the ERAT cache 210A. In conventional systems, if a write permission is requested for the ERAT cache entry and that entry is located in the ERAT cache 210A, but that ERAT cache entry is established with only a read permission, the ERAT cache 210A must first checkin the ERAT cache entry, via a checkin request/response transaction, to the MMU 206 and subsequently checkout the ERAT cache entry, via a checkout request/response transaction, from the MMU 206 requesting write permission for the ERAT cache entry, to avoid duplicate entries in the ERAT cache 210A. The, processor incurs latency in performing these transactions to update the permissions of the ERAT cache entry. In particular, the latency incurred for the checkin request/response transaction can range from 15% to 60% (and possibly even higher) of the total latency incurred for changing permissions of the ERAT cache entry.

Figure 3:
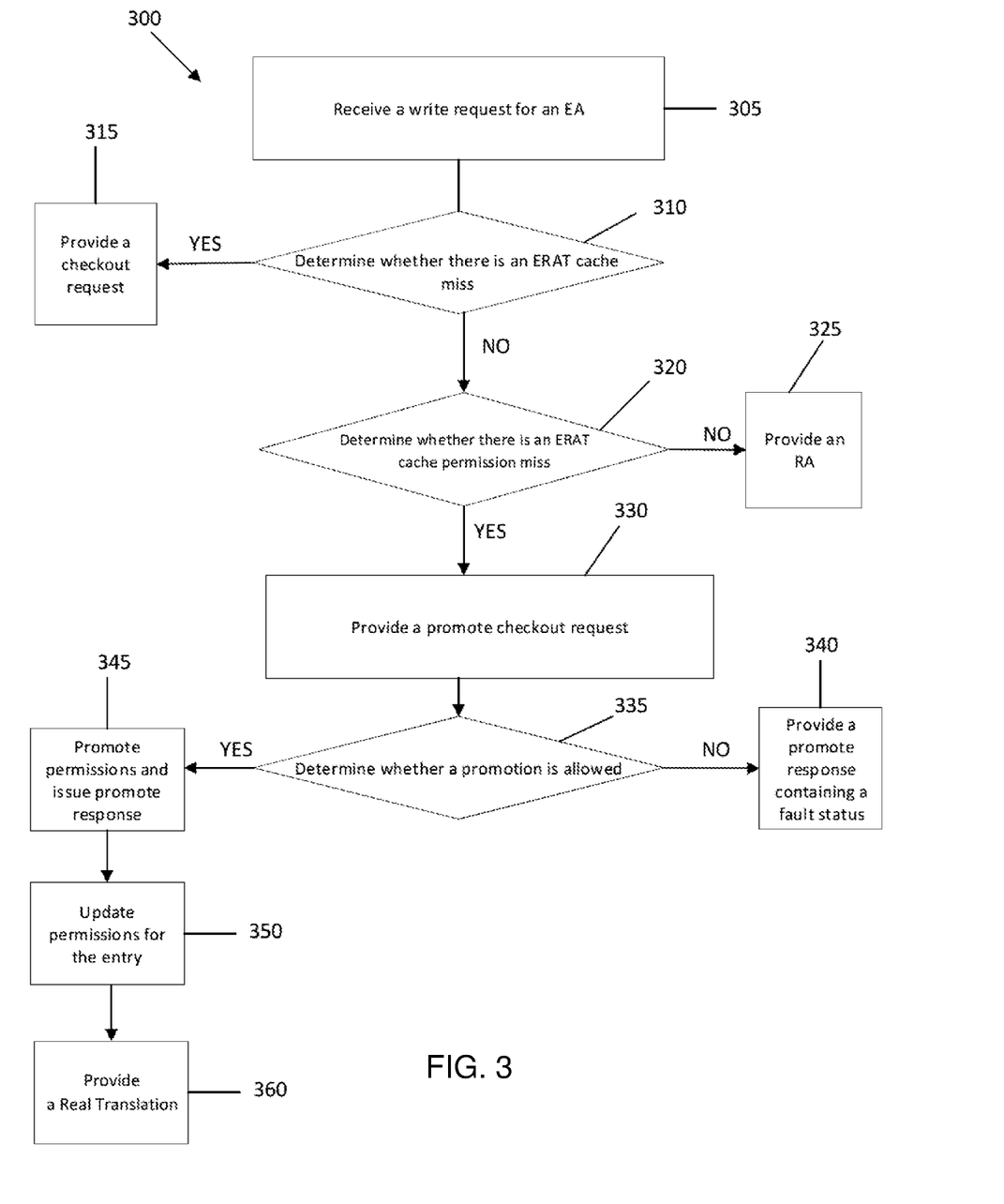
FIG. 3 is a flowchart illustrating a method of increasing the efficiency of a computer system, according to embodiments of the present disclosure.

FIG. 3 is an exemplary flowchart in accordance with various embodiments illustrating and describing a method of increasing the efficiency of a computer system, and more specifically a method of decreasing latency in EA to RA translations in a processor, particularly involving processes that require a write operation to an ERAT entry. While the method 300 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 3, but the process may be integrated and/or one or more steps may be performed together, simultaneously, or the steps may be performed in the order disclosed or in an alternate order.

In some embodiments, a write request to an EA that requires an ERAT cache entry lookup to provide the translated address, i.e., the RA, is requested at 305, the request preferably being received by the DMA controller 216A. For example, the DMA controller 216A, on behalf of the AU 202A, may receive a request for a write to an EA, in which the EA requires translation to an RA. The DMA controller 216A may pass the request to the ERAT cache 210A, and the ERAT cache 210A may search for the entry in the ERAT cache 210A.

In response to receiving a write request, a determination at 310 is made, preferably in some embodiments by the ERAT cache 210A, as to whether there is an ERAT cache miss. In a case in which the ERAT cache 210A determines that there is an ERAT cache miss (310: YES), the ERAT cache 210A may provide a checkout request at 315 to the MMU 206 for the translated address. In various aspects, an ERAT cache miss may occur when there is no entry matching the supplied EA in the ERAT cache 210A, and an ERAT cache miss may not occur when there is an entry matching the supplied EA in the ERAT cache 210A. In a case in which the ERAT cache 210A determines that there is not an ERAT cache miss (310: NO), a determination at 320 is made, preferably in some embodiments by the ERAT cache 210A, as to whether there is an ERAT cache permissions miss. In an aspect, an ERAT cache permissions miss may occur when an ERAT cache entry is established with read permissions for the EA and a write permission for the EA is requested. In some embodiments, an ERAT cache entry, established with read permissions, may include a C bit set to 0, while an ERAT cache entry established with write or read/write permissions may include a C bit set to 1. The C bit entries for the various permissions may be switched.

In a case in which the ERAT cache 210A determines that there is not an ERAT cache permissions miss (320: NO), the ERAT cache 210A provides the RA at 325 from the ERAT cache entry that matched the EA to the DMA controller 216A associated with AU 202A. For example, the ERAT cache 210A may determine that the entry is established with write permissions, and may provide the RA from the entry with the EA to RA translation to the AU 202A to provide the translation to perform the request, e.g., write the compression results of a page to a particular EA.

In a case in which the ERAT cache 210A determines that there is an ERAT permissions miss (320: YES), the ERAT cache 210A at 330 provides a promote checkout request to the MMU 206. For example, the ERAT cache 210A may locate the ERAT cache entry and determine that the entry is established with read only permission and a write is requested. The ERAT may provide a promote checkout request to the MMU 206. The promote checkout request eliminates the need to perform a checkin request and checkin response to update the permissions of an ERAT cache entry. In response to receiving the promote checkout request, a determination is made at 335 as to whether a promotion of the ERAT cache entry's permissions are allowed. In various embodiments, the MMU 206 receives the promote checkout request, and in an aspect, the MMU 206 determines whether a promotion of the ERAT cache entry's permissions is allowed. The MMU 206 in an aspect checks if the PTE, corresponding to the ERAT cache entry, allows write permissions or read/write permissions to determine whether promotion of the entry's permissions are allowed. The PTE, in an embodiment, is located in the TLB 214 of the MMU 206; and if the MMU TLB is inclusive of the ERAT cache 210A, the IUSB bit for this entry would be set to 1. In cases in which the PTE is located in the TLB 214, then the latency for determining if a promotion is allowed is less than the latency incurred if the MMU 206 has to perform a tablewalk to obtain the PTE to determine if promotion of permissions is allowed. If a tablewalk is performed, embodiments may cache the resulting PTE in the TLB and set the InUse bit, e.g., the C bit, for the TLB entry to 1.

In a case in which the MMU 206 determines that promotion of the entry's permissions in the ERAT cache are not allowed (335: NO), then at 340 a promote checkout response is preferably provided by the MMU 206 to the ERAT cache 210A, which contains a page fault status in the promote response. The page fault may be invoked when the request for the promotion of the entry's permission in the ERAT cache is a violation. For example, when a write operation is not able to be performed for the Real Address, a page fault may be invoked, preventing the entry in the ERAT cache from gaining write permissions. The promote checkout response in some embodiments can indicate to the AU 202A, via the DMA controller 216A, and the ERAT cache 210A that an error occurred in attempting to promote the permissions of the ERAT cache entry. In one example, the DMA controller 216A, on behalf of AU 202A, may stop the request, e.g., by stopping the attempt to write the compression results of the page. In another example, the DMA controller 216A, on behalf of AU 202A, may note the error to the operating system 154, such that the operating system 154 receives an interrupt and determines whether the operating system 154 has to fix the page fault or not.

In a case in which it is determined, in various embodiments by the MMU 206, that a promotion of the entry in the ERAT cache is allowed (335: YES), the MMU 206 at 345 promotes e.g., changes, the permissions of the PTE in the TLB 214 and provides a promote checkout response to the ERAT cache 210A indicating that the promotion was successful. The MMU 206 promotes the permissions of the PTE by setting the C bit of the entry to 1 in the TLB 214 and in the PTE if the C bit was not already set.

In response to receiving a promote checkout response indicating that the promotion was successful, at 350, the ERAT cache 210A updates the permissions for the ERAT cache entry. For example, the ERAT cache 210A may update the C bit of the ERAT cache entry to 1 so that the permissions are updated to either write permissions or read/write permissions. Having the permissions updated, at 360, the ERAT cache 210A provides the requested translation for the EA of the write request, namely the RA, to the AU 202A, via the DMA controller 216A. As the permissions of the selected ERAT cache entry are updated during the promote checkout request and promote checkout response transaction, the need to issue a checkin request for the ERAT cache entry and receive a checkin response for that entry is eliminated, which thereby decreases latency and increases the efficiency and/or speed of the operation, and/or the processor 156.

In another embodiment, a read request to an EA that requires an ERAT cache 210A lookup to provide the translated address, i.e., the RA, is requested, with the request preferably being received by the DMA controller 216A. For example, during operations, the DMA controller 216A on behalf of the AU 202A may receive a request for a read to an EA and the EA requires translation to an RA. The DMA controller 216A may pass the request to the ERAT cache 210A to retrieve the ERAT cache entry containing the translation. In response to the translation not being located in the ERAT cache 210A (e.g., an ERAT cache miss), the ERAT cache 210A may provide a checkout request to the MMU 206 requesting read permissions for the ERAT cache entry. The MMU 206 checks TLB 214 to find the PTE, or if the entry is not located in the TLB 214, the MMU 206 performs a tablewalk. Once the MMU 206 locates the PTE, if the MMU 206 determines that the PTE includes write permissions, the MMU 206 issues a checkout response with write permissions for the entry to the ERAT cache 210A. In various embodiments, a PTE may include write permissions when a C bit of the PTE is set to 1. In response to receiving the checkout response with write permissions for the ERAT cache entry, the ERAT cache 210A sets the C bit of the entry to 1, updating the permissions for the entry in the ERAT cache 210A to write permissions or read/write permissions. In a subsequent request for write permissions of the ERAT cache entry, an ERAT cache hit occurs for that entry so the translation is supplied, and the ERAT cache miss latency, e.g., a checkout request/response transaction with the MMU 206 and possibly a checkin request/response transaction with the MMU 206 if no free entry was found in the ERAT cache, is avoided.

While the illustrative embodiments described above are preferably implemented in hardware, such as in units and circuitry of a processor, various aspects of the illustrative embodiments may be implemented in software as well. For example, it will be understood that each block of the flowchart illustrations in FIG. 3, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions, and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

In one or more embodiments, a method of processing information in a processor of a computer system includes receiving a request for an ERAT. The method in an aspect includes determining whether there is a permissions miss. The method, in an embodiment, includes changing, in response to determining there is a permissions miss, permissions of an ERAT cache entry, and, in an aspect providing a Real Address translation.

In one or more embodiments, a computer program product includes a non-transitory computer-readable storage medium having program instructions embodied therewith, the program instructions executable by one or more processors. The program instructions in an embodiment includes receiving a request for an ERAT. The program instructions in an aspect includes determining whether there is a permissions miss, and in an aspect includes changing, in response to determining there is a permissions miss, permissions of the ERAT cache entry, and in an aspect, providing a Real Address translation.

In one or more embodiments, a computer system includes one or more processors, each of the one or more processors including a MMU, at least one AU, and at least one ERAT cache, the ERAT cache being associated with, preferably included within a respective AU; one or more non-transitory computer-readable storage media; and program instructions, stored on the one or more non-transitory computer-readable storage media, executable by at least one of the one or more processors. The program instructions in an embodiment includes receiving a request for an ERAT. The program instructions, in an aspect, includes determining whether there is a permissions miss, and in a further aspect, changing, in response to determining there is a permissions miss, permissions of the ERAT cache entry, and in an aspect can include providing a Real Address translation. The request for the ERAT in an aspect includes a request to establish write permission for the ERAT cache entry.

In one or more embodiments, an information handling system includes one or more processors having one or more acceleration units and one or more memory management units (MMU) wherein at least one acceleration unit has an Effective Address to Real Address Translation (ERAT) cache having a plurality of entries. In an aspect, the processor is configured and adapted to receive a request for an Effect Address to Real Address Translation (ERAT). In an aspect, the processor is configured and adapted to determine whether there is a permissions miss. In an aspect, the processor is configured and adapted to change, in response to determining there is a permissions miss, permissions of an ERAT cache entry. In another aspect, the processor is configured and adapted to provide a Real Address translation. The request for the ERAT in an aspect includes a request for establishing write permissions for the ERAT cache entry.

One or more embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

The corresponding structures, materials, acts, and equivalents of all means or step plus function elements in the claims below are intended to include any structure, material, or act for performing the function in combination with other claimed elements as specifically claimed. The description of the embodiments of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The embodiments and examples were chosen and described in order to best explain the principles of the disclosure and the practical application, and to enable others of ordinary skill in the art to understand the disclosure for various embodiments with various modifications as are suited to the particular use contemplated.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

It will be clear that the various features of the foregoing systems and/or methodologies may be combined in any way, creating a plurality of combinations from the descriptions presented above.

It will be further appreciated that embodiments of the present disclosure may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of processing information in a processor of a computer system, wherein the processor comprises:
   a memory management unit (MMU) configured to translate an effective address to a real address, the MMU having a translation-lookaside-buffer (TLB) having a plurality of TLB entries for storing a plurality of Effective Address to Real Address Translations (ERATs); and
   an acceleration unit configured to provide an interface between elements on the processor and processing elements external to the processor, the acceleration unit in communication with the MMU and having an ERAT cache having a plurality of ERAT cache entries for storing a plurality of ERATs provided by the MMU, wherein each ERAT cache entry has a corresponding ERAT in an entry in the TLB,
   the method comprising:
   receiving by the ERAT cache a request for an Effective Address to Real Address Translation (ERAT);
   determining whether there is a matching ERAT cache entry in the plurality of ERAT entries in the ERAT cache;
   determining whether, in response to there being a matching ERAT cache entry in the ERAT cache, there is an access permissions miss for the matching ERAT cache entry in the ERAT cache;
   providing, in response to determining there is an access permissions miss for the matching ERAT cache entry, a promote checkout request to the MMU;
   determining whether, in response to providing a promote checkout request to the MMU unit, a promotion of the access permissions for the matching ERAT cache entry is allowed; and
   providing, in response to determining the promotion of the access permissions for the matching ERAT entry is not allowed, a promote checkout response containing a fault status to the matching ERAT cache entry;
   changing, in response to determining the promotion of the access permissions for the matching ERAT cache entry is allowed, the access permissions of the matching ERAT cache entry in the ERAT cache for which there was the access permissions miss; and
   providing a Real Address translation from the matching ERAT cache entry with the changed access permissions in the ERAT cache.

2. The method of claim 1, wherein the access permission miss occurs when the matching ERAT cache entry is established with read permissions for an Effective Address and a write permission for the Effective Address is received in the request.

3. The method of claim 1, wherein the request received by the ERAT cache for the ERAT comprises a request for establishing write permission for the ERAT cache entry.

4. The method of claim 1, wherein the fault status is invoked when the matching ERAT cache entry indicates a write request is not permitted, and the processor sends an interrupt to an operating system of the computer system.

5. The method of claim 1, wherein changing the access permissions of the ERAT cache entry further comprises changing permissions in the MMU by changing a C bit of a page table entry corresponding to the matching ERAT cache entry, where the C bit indicates the access permissions.

6. The method of claim 1, wherein changing the permissions of the matching ERAT cache entry further comprises updating the permissions of the matching ERAT cache entry by changing a C bit, where the C bit indicates access permissions.

7. The method of claim 1, wherein changing the permissions of the matching ERAT cache entry further comprises updating the access permissions of the matching ERAT cache entry from read permission to include either write permission or read/write permission.

8. The method of claim 1, wherein receiving the request for the ERAT comprises receiving a read request to an address translated by the MMU.

9. The method of claim 1, further comprising marking an entry in the TLB as in use in response to a translation in the TLB entry residing in an entry in the ERAT cache.

10. A computer program product for a processor, the processor comprising:
a memory management unit (MMU) configured to translate an effective address to a real address, the MMU having a translation-lookaside-buffer (TLB) having a plurality of TLB entries for storing a plurality of Effective Address to Real Address Translations (ERATs); and
an acceleration unit configured to provide an interface between elements on the processor and processing elements external to the processor, the acceleration unit in communication with the MMU and having an ERAT cache having a plurality of ERAT cache entries for storing a plurality of ERATs provided by the MMU, wherein each ERAT cache entry has a corresponding ERAT in an entry in the TLB,
the computer program product comprising:
a non-transitory computer-readable storage medium having program instructions embodied therewith, the program instructions executable by the processor, the program instructions when executed by the processor cause the processor to:
receive by the ERAT cache a request for an Effective Address to Real Address Translation (ERAT);
determine whether there is a matching ERAT cache entry in the ERAT cache storing the plurality of ERATs;
determine whether, in response to there being a matching ERAT cache entry in the ERAT cache, there is an access permissions miss for the matching ERAT cache entry;
determine, in response to determining there is an access permissions miss for the matching ERAT cache entry, whether a promotion of the access permission for the matching ERAT cache entry is allowed; and changing, in response to determining promotion of the access permission for the matching ERAT cache entry is allowed, the access permissions of the matching ERAT cache entry for which there was the access permission miss without creating a new ERAT cache entry; and
providing a Real Address translation from the matching ERAT cache entry with the changed access permissions in the ERAT cache,
provide, in response to determining the promotion of the access permissions for the matching ERAT cache entry is not allowed, a promote checkout response containing a fault status to the matching ERAT cache entry.

11. The computer program product of claim 10, further comprising instructions that when executed by the processor cause the processor to:
provide, in response to determining there is an access permission miss for the matching ERAT cache entry, a promote checkout request to the MMU; and
determine whether, in response to providing a promote checkout request to the MMU, a promotion of the access permission for the matching ERAT cache entry is allowed.

12. The computer program product of claim 10, wherein the request for the ERAT received by the ERAT cache comprises a request for establishing write permission for the ERAT cache entry.

13. The computer program product of claim 10, wherein changing the access permissions of the matching ERAT cache entry further comprises updating the access permissions of the matching ERAT cache entry from read permission to include either write permission or read/write permission.

14. The computer program product of claim 10, further comprising instructions that when executed by the processor cause the processor to mark an entry in the TLB as in use in response to a translation in the TLB entry residing in an entry in the ERAT cache.

15. An information handling system comprising:
one or more processors having one or more acceleration units and one or more memory management units (MMUs) wherein at least one of the MMUs is configured to translate an effective address to a real address, the MMU having at least one translation-lookaside-buffer (TLB) having a plurality of TLB entries for storing a plurality of Effective Address to Real Address Translations (ERATs) and wherein at least one acceleration unit is configured to provide an interface between elements on the processor and processing elements external to the processor, the acceleration unit having an Effective Address to Real Address Translation (ERAT) cache having a plurality of ERAT cache entries for storing a plurality of ERATs provided by the MMU, wherein each ERAT cache entry has a corresponding ERAT in an entry in the TLB;
the processor configured and adapted to:
receive by the ERAT cache a request for an Effective Address to Real Address Translation (ERAT);
determine whether there is a matching ERAT cache entry in the ERAT cache;
determine whether, in response to there being a matching ERAT cache entry in the ERAT cache, there is an access permission miss for the matching ERAT cache entry;
determine, in response to determining there is an access permission miss for the matching ERAT cache entry, whether a promotion of the access permissions of the matching ERAT cache entry is allowed; and change, in response to determining promotion of the access permissions of the matching ERAT cache entry is allowed, the access permission of the matching ERAT cache entry for which there was an access permissions miss; and provide a Real Address translation from the matching ERAT cache entry with the changed access permission in the ERAT cache, wherein the request for the ERAT received by the ERAT cache comprises a request for establishing write permissions for the ERAT cache entry, provide, in response to determining the promotion of the access permissions of the matching ERAT entry is not allowed, a promote checkout response containing a fault status to the matching ERAT cache entry.

16. The information handling system of claim 15, wherein the access permission miss occurs when the ERAT cache entry is established with read permissions for an Effective Address and a write permission for the Effective Address is received in the request.

17. The information handling system of claim 15, wherein the processor is further configured and adapted to:

provide a checkout request to the MMU requesting read permission for the matching ERAT cache entry;

determine whether a page table entry (PTE) corresponding to the matching ERAT cache entry has read/write permission;

provide, in response to determining that the PTE corresponding to the matching ERAT cache entry has read/write permissions, a checkout response including read/write permission for the matching ERAT cache entry; and update the access permissions of the matching ERAT cache entry to read/write permission.

18. The information handling system of claim 15, wherein the processor is further configured and adapted to mark an entry in the TLB as in use in response to a translation in the TLB entry residing in an entry in the ERAT cache.

* * * * *